United States Patent [19]

Robbins

[11] Patent Number: 4,783,242

[45] Date of Patent: Nov. 8, 1988

[54] DISTILLATION SYSTEM AND PROCESS

[75] Inventor: Lanny A. Robbins, Midland, Mich.

[73] Assignee: The Dow Chemical Company, Midland, Mich.

[21] Appl. No.: 866,176

[22] Filed: May 22, 1986

[51] Int. Cl.$^4$ .......................... B01D 3/06; B01D 5/00
[52] U.S. Cl. ........................................ 203/87; 203/88;
203/96; 203/97; 203/98; 202/176; 202/186;
202/199; 202/204; 159/24.3; 159/47.1
[58] Field of Search .................. 203/87, 88, 95, 96,
203/97, 98, 91–94, 12; 202/177, 176, 186, 199,
204, 205, 198; 159/2.1, 24.3, 47.1, DIG. 16

[56] References Cited

U.S. PATENT DOCUMENTS

| | | | |
|---|---|---|---|
| 16,267 | 2/1926 | Stevens | 203/87 |
| 1,537,563 | 5/1925 | Suczek | 159/24.3 |
| 2,152,155 | 3/1939 | Rude | 203/87 |
| 2,537,259 | 1/1951 | Cleaver et al. | 159/24.3 |
| 2,666,707 | 1/1954 | Beu | 203/87 |
| 4,306,945 | 12/1981 | Montanari et al. | 203/87 |
| 4,484,983 | 11/1984 | Bannon | 203/87 |
| 4,595,461 | 6/1986 | Jeromin et al. | 202/186 |

FOREIGN PATENT DOCUMENTS

| | | | |
|---|---|---|---|
| 1519633 | 5/1971 | Fed. Rep. of Germany | 159/24.3 |
| 2433963 | 4/1980 | France | 159/24.3 |
| 17145 | of 1914 | United Kingdom | 159/24.3 |
| 640946 | 8/1950 | United Kingdom | 159/24.3 |

Primary Examiner—David L. Lacey
Assistant Examiner—V. Manoharan
Attorney, Agent, or Firm—Joseph R. Prieto

[57] ABSTRACT

A distillation system and process for removing vaporizable components from an aqueous medium including a distillation column for receiving an aqueous medium containing vaporizable components and passing steam through the column such that the steam directly contacts the aqueous medium to vaporize at least a portion of the components, a condenser in a communication with the column to condense at least a portion of the vapor in the column, a separator in communication with the condenser to separate flash vapor from liquid condensate in the separator and a thermal compressor in communication with the separator and the column to remove vapor from the separator and to inject exhaust steam from the thermal compressor into the column.

10 Claims, 4 Drawing Sheets

DISTILLATION SYSTEM AND PROCESS

BACKGROUND OF THE INVENTION

This invention relates to a distillation system and process, and more particuarly, to a distillation system and process for recovering vaporizable components from an aqueous medium.

In commercial distillation processes, i.e., stripping, fractionation and rectification processes, steam is used to vaporize and expel volatile components from water containing other elements, salts or compounds. A substantial quantity of steam is consumed in such conventional processes, increasing the operating costs of such processes. In a basic distillation process, for example, in a stripping system, the industry has continued to seek further optimization in terms of lower energy requirements, lower capital expenditures, i.e., reduction in the number of pieces and size of required apparatuses and a reduction of solution flow rates while maintaining high throughput It is desired in this invention to provide an improvement in a process for removing vaporizable components from an aqueous medium containing a mixture of vaporizable components and other salts, elements and compounds whereby steam consumption is minimized.

SUMMARY OF THE INVENTION

One aspect of the present invention is a distillation system for removing vaporizable components from an aqueous medium comprising:

(a) a distillation column having an inlet for receiving an aqueous medium containing vaporizable components, (b) a means for passing steam through the column such that the steam directly contacts the aqueous medium containing vaporizable components in the column and vaporizes at least a portion of the components, (c) a condenser means in a communication with the column to condense at least a portion of the vapor in the column, (d) a separator means in a communication with the condenser means to separate flash vapor from a recirculated fluid in the separator, and (e) a thermal compressor means in a communication with the separator means and the column to remove vapors from the separator and to inject motive steam from the thermal compressor means into the column.

Another aspect of the present invention is a distillation process for removing vaporizable components from an aqueous means comprising:

(a) introducing an aqueous medium containing vaporizable components into a distillation column for removing at least a portion of the components from the aqueous medium, (b) contacting the aqueous medium with a sufficient current of steam from a thermal compressor to vaporize at least a portion of the vaporizable components, (c) passing at least a portion of the vapor from the distillation column through a first space of a condenser means having a first and second space, (d) passing a recirculated fluid through the second space of the condenser means sufficient to condense at least a portion of the vapors to an aqueous condensate said recirculated fluid passing through the condenser means to a separator for separating steam from an aqueous liquid, and (e) passing the steam from the separator into the thermal compressor to form steam for introducing into the distillation column.

DETAILED DESCRIPTION OF THE PREFERRED EMBODIMENT

Figure 1:
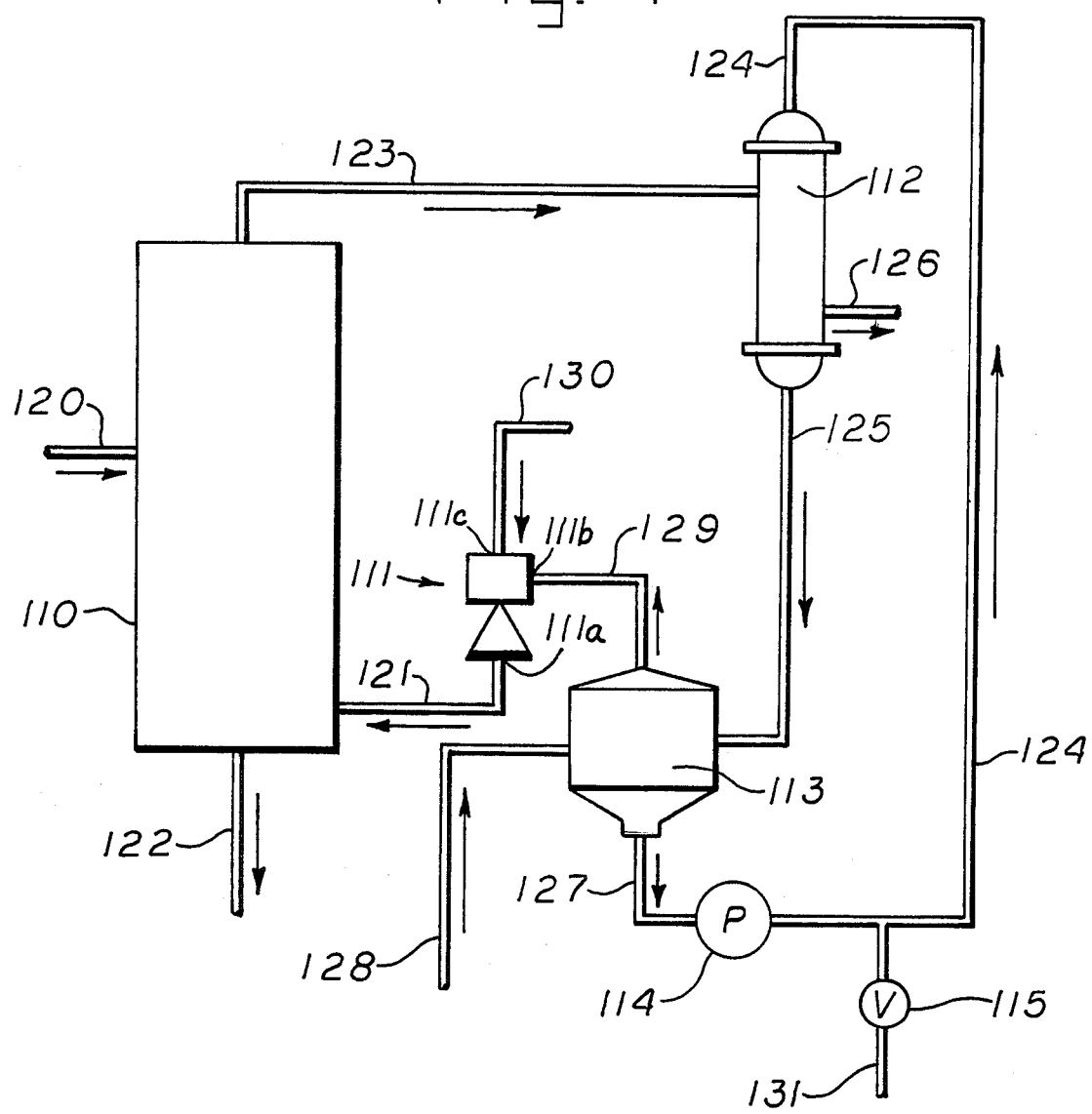
FIG. 1 is a schematic representation of one embodiment of a system useful in practicing the present process.

The present distillation system and process as illustrated in the drawings and as described below may be useful for removing any vaporizable component(s) from an aqueous medium. The various pieces of equipment used in the process of the present invention are conventional apparatuses connected together by conventional conduits or piping. However, the apparatuses in combination and the overall process is novel.

By "aqueous medium" it is meant (1) water containing a vaporizable component or mixture of vaporizable components, or (2) water containing a vaporizable component or mixture of vaporizable components in combination with other salts, elements or compounds dissolved or dispersed in the water.

By "vaporizable components" it is meant components with a relative volatility to water greater than 1.0 when they are dissolved in water. For example, vaporizable components may include trichloroethane, propylene chlorohydrin, bromine, methylene chloride, benzene, toluene and mixtures thereof.

The vaporizable components in the aqueous medium are vaporized with steam by contacting the aqueous medium with the steam at conditions sufficient to vaporize at least a portion of the vaporizable components. Steam may be used as the vaporizing gas, for example, at a temperature of from about 10° C. to about 120° C. and a pressure of about 9 mm of Hg to about 1500 mm Hg. Preferably, steam at a temperature of from about 50° C. to about 100° C. and a pressure of about 90 mm Hg to about 760 mm Hg is used. Contacting the vaporizable components in the aqueous medium with steam is preferably carried out by countercurrent flow.

Referring now to FIG. 1, an aqueous medium feed material containing a vaporizable component(s) is introduced, through a conduit 120, into an evaporation apparatus 110 such as a column or tank wherein the aqueous medium feed material is contacted with a stream or current of vaporizing gas such as steam to vaporize vaporizable components in the feed material. The apparatus 110, herein referred to as a distillation column may be a stripping column, a fractionation column or rectification column. The current of steam is introduced into column 110 through a conduit 121 from the discharge section 111a of a thermal compressor 111. The steam contacts the feed material under process conditions sufficient to vaporize substantially all of the vaporizable components in the feed material. Preferably, the contacting of feed material with the steam is carried out in a counter-current fashion.

An aqueous liquid material leaves the column 110 through a conduit 122 located near the bottom of the column 110 to a use point. Vapors, i.e. the vapors containing the vaporizable components, formed in the column 110 pass through a conduit 123 located near the top of the column 110 to a condenser means 112 adapted for condensing at least a portion of the vapors to an aqueous condensate. A conventional condenser, for example, a shell and tube-type heat exchanger may be used as the condenser means 112. Preferably, the vapors are passed through the shell-side of the condenser 112 and a "recirculated fluid" adapted for use as a cooling fluid for cooling at least a portion of the vapors in the condenser 112 is passed through the tube-side of the condenser 112 such that at least a portion of the vapors in the shell-side of the condenser 112 are condensed to a liquid condensate. By "recirculated fluid" in the present invention it is meant a substantially aqueous stream such as water or water mixed with salts, elements and other compounds. The recirculated fluid may be in the form of a liquid or a mixture of liquid and vapor. The recirculated fluid is preferably maintained at from 0° C. to about 8° C. lower than the column 110 overhead vapor stream in conduit 123.

As shown in FIG. 1, the recirculated fluid is passed through the condenser 112 through conduit 124 from a separator 113 and exits the condenser 112 through a conduit 125. Any noncondensable gases and uncondensed vapors in the shell side of the condenser 112 exit the condenser 112 and are passed to a use point or to a point for further processing through a conduit 126. In addition to the uncondensed vapors exiting the condenser 112 through the conduit 126, at least a portion of the condensed vapors or liquid condensate referred to herein as the overhead distillate, may be transferred to a use point or to a point for further processing through the conduit 126.

The recirculated fluid, in the conduit 125, may contain vapor as steam and liquid as water. The recirculated fluid passes through the conduit 125 to a separator 113 to separate the vapor from the liquid. In addition, the separator 113 serves as a flash tank for flashing at least a portion of the liquid into steam herein referred to as "flash steam". The recirculated fluid in the separator 113 exits the separator 113 through a conduit 127 as a liquid and is pumped through the conduit 124 to the tube-side of the condenser 112 with a pump means 114. The recirculated fluid may be supplemented, as required, with makeup recirculated fluid supplied through a conduit 128 from any source to the separator 113. For example, a stream of hot water may be introduced to the separator 113. Although the water is introduced in the separator 113, the makeup water may be introduced at any point of the "recirculated fluid loop" consisting of the conduit 124, the conduit 125 and the conduit 127.

Any flash steam present in the separator 113 is passed through a conduit 129 to the thermal compressor 111 and taken up by the suction inlet 111$b$ of the thermal compressor 111. The actuating gas for the thermal compressor is motive steam passing through a conduit 130 to the actuating gas inlet 111$c$ of the thermal compressor 111. The motive steam may be supplied from any source. Typically, steam at from about 30 psig to about 100 psig is used. The discharge section 111$a$ of thermal compressor 111 is in communication with the conduit 121 which, in turn, is connected to column 110 to supply the steam used in the column 110 for contacting the aqueous medium and vaporizing the vaporizable components in the aqueous medium.

Figure 2:
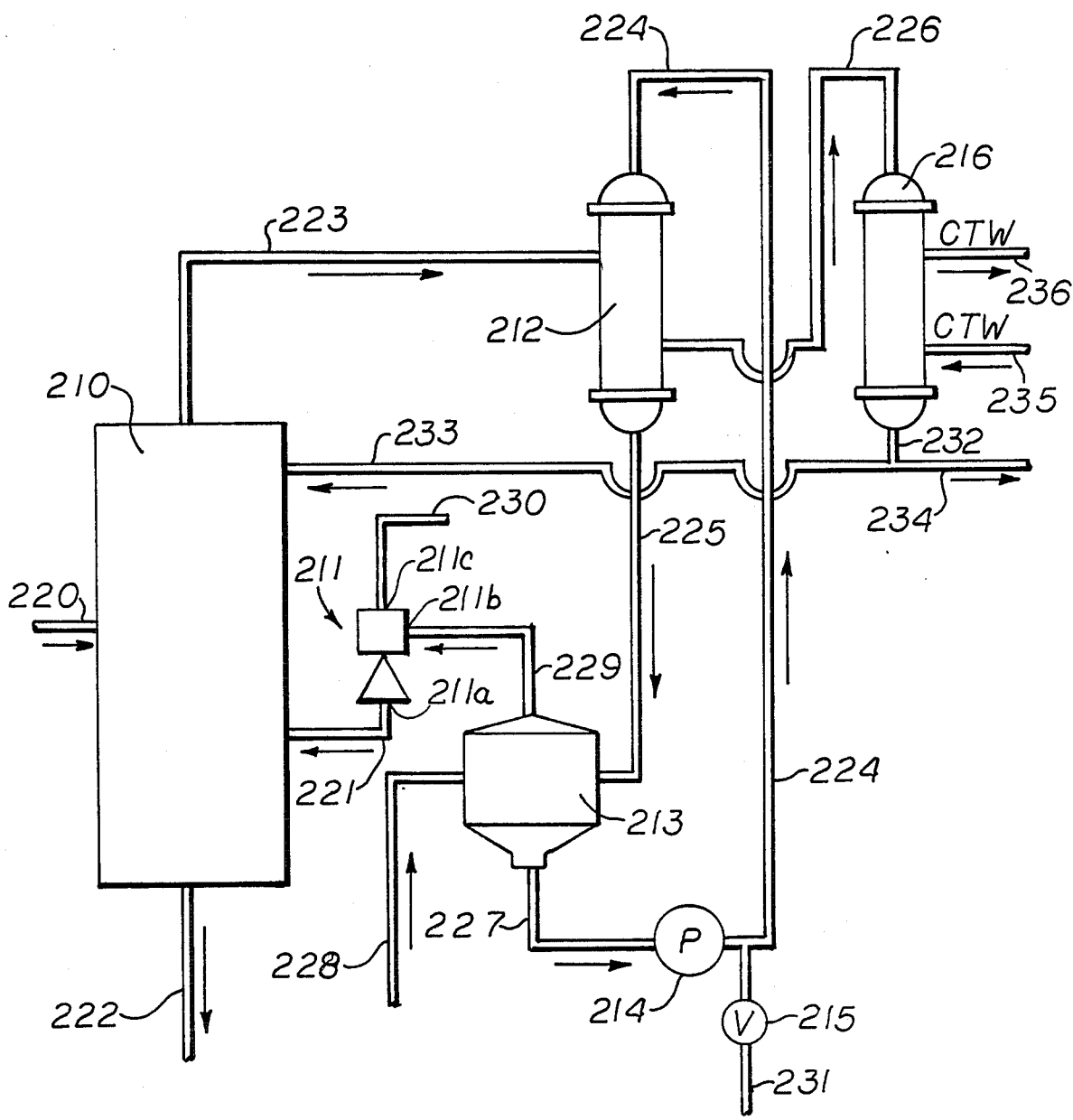
FIG. 2 is a schematic representation of another embodiment of a system useful in practicing the present process.

With reference to FIG. 2, there is shown another embodiment of a distillation system according to the present invention which is particuarly useful for stripping and enriching miscible compounds from water containing other compounds. Other compounds may include, for example, those which tend to increase the boiling point of the water, for example, salt, sulfuric acid or caustic. The distillation system shown in FIG. 2 may also be useful for stripping and enriching miscible compounds from water that contains low volatility corrosive compounds for example, bromine and iodine.

In FIG. 2, an aqueous medium feed material containing vaporizable components is introduced into a distillation column 210 through a conduit 220. The feed material is contacted with a current of steam introduced, through a conduit 221, into the column 210 near the bottom of the column 210 from the discharge section 211$a$ of a thermal compressor 211. The steam vaporizes substantially all of the vaporizable components in the feed material. Preferably, the contacting of the feed material with the steam is carried out by a countercurrent flow.

An aqueous liquid material exits the column 210 through a conduit 222 near the bottom of the column 210 to a use point. Although not shown in FIG. 2, the bottoms exiting through the conduit 222 may be used to preheat the feed material via a heat exchanger means preferably, made of corrosion resistant material. The heat exchanger means may be, for example, a shell and tube-type heat exchanger. For example, the feed material may be preheated by introducing the feed material into the tube-side of the heat exchanger and substantially simultanesouly introducing the bottoms of the column 20 into the shell-side of a the heat exchanger sufficient to preheat the feed material. The preheated material exiting the exchanger may then be introduced into the distillation column 210 via the conduit 220.

With reference to FIG. 2, vapors formed in the column 210 pass through a conduit 223 near the top of the column 210 to a condenser means 212 to condense at least a portion of the vapors. A conventional condenser such as a shell and tube-type heat exchanger, may be used for the condensor mean 212. Although not shown in FIG. 2, at least a portion of the condensed vapors from the condenser 212 may be refluxed back to the column 210 near the top of the column 210.

As shown in FIG. 2, a recirculated fluid is passed through a conduit 224 to the tube side of the condensor 212 from a separator 213 and exits the condensor 212 through a conduit 225. Preferably, noncondensable gases, uncondensed vapors and at least a portion of the condensed vapors in the shell side of the condensor 212 are passed through a conduit 226 to a second condenser means 216 to condense substantially all the vapors to a liquid condensate. The condenser means 216 may also be a conventional shell and tube-type heat exchanger. Any conventional cooling fluid, such as cooling tower water may be passed through the conduit 235 and 236 and used for cooling the vapors in the condensor 216. The condensed vapor or liquid condensate, referred to herein as the overhead distillate, is passed through a conduit 232, and preferably, at least a portion of the overhead distillate is refluxed or recycled back to the column 210 through a conduit 233. Optionally, the overhead distillate from the conduit 232 may be combined with a portion of the condensed vapors of the condenser 212 (not shown). In this instance, at least a portion of the overhead distillate from the conduit 232 may be transferred to a use point or to a point for further processing through a conduit 234.

The recirculated fluid leaving the condenser 212 through a conduit 225 may contain vapor as steam and liquid as water. The recirculated fluid passes through the conduit 225 and is introduced to a separator 213 to separate the vapor from the liquid. The separator 213 provides a means to flash at least a portion of the liquid as flash steam. The recirculated fluid may be supplemented, as required, with makeup recirculated fluid supplied through a conduit 128 from any source to the separator 213. For example, a stream of hot water may be introduced to the separator 213. Although the water is introduced in the separator 213, the makeup water may be introduced at any point of the "recirculated fluid loop" consisting of the conduit 224, the conduit 225 and the conduit 227. The recirculated fluid in the separator 213 exits the separator 213 through a conduit 227 as a liquid, and is recycled back to the tube-side of the condenser 212 through conduit 224 with a pump means 214. A valve means 215 and a conduit 231 may be used for removing at least a portion of the recirculated fluid in the conduit 224. At least a portion of the recirculated fluid may be passed from the conduit 224 to a use point through the conduit 231.

Any flash steam in the separator 213 is passed to the suction inlet 211b of the thermal compressor 211 through a conduit 229. Motive steam passes through a conduit 230 to the actuating gas inlet 211c of the thermal compressor 211. The discharge section 211a of the thermal compressor is in a communication with the conduit 221 which, in turn, is connected to the column 210 to supply the steam to the column 210 for vaporizing the vaporizable components in the aqueous medium.

Figure 3:
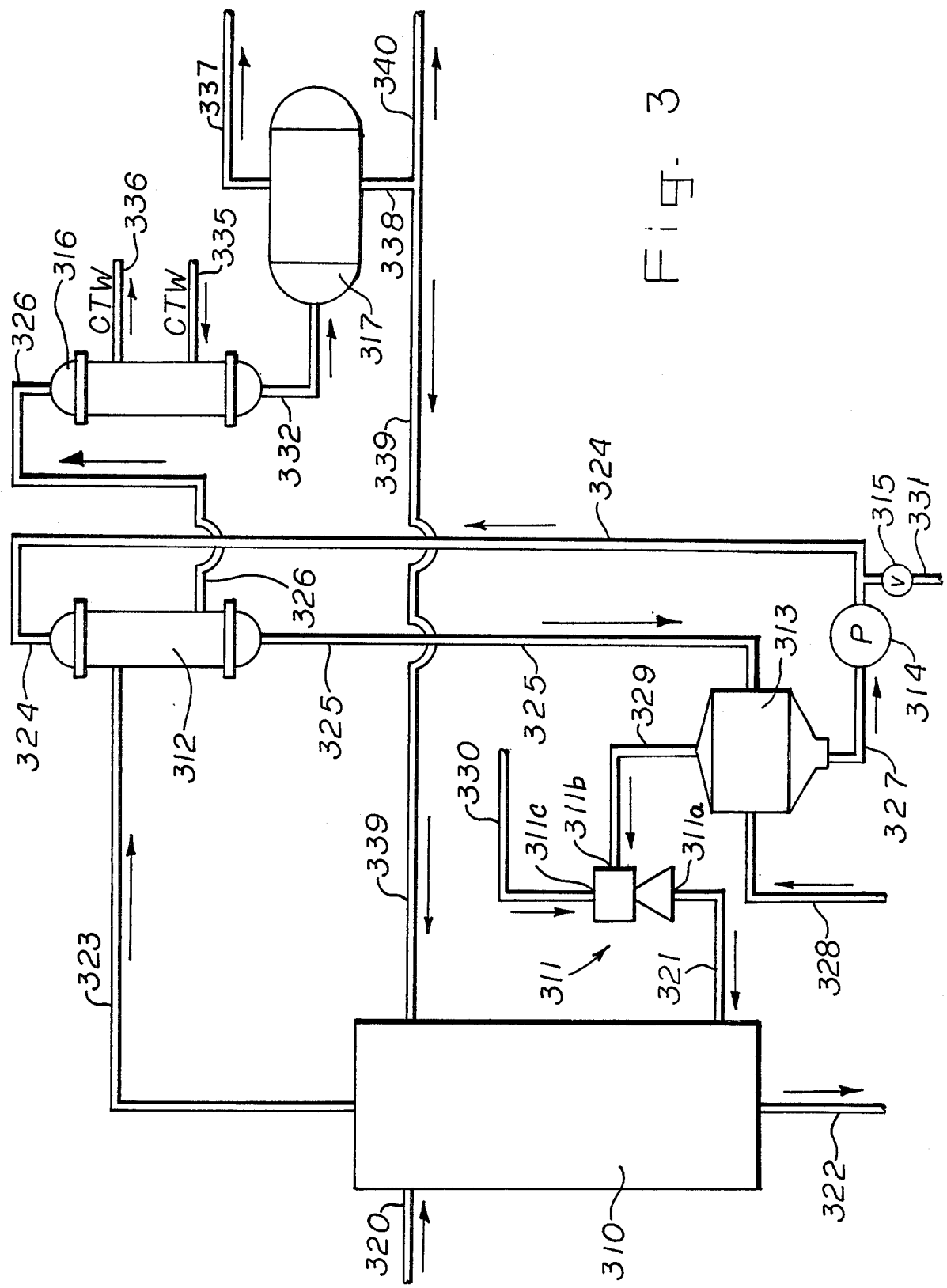
FIG. 3 is a schematic representation of another embodiment of a system useful in practicing the present process.

Another embodiment of a distillation system according to the present invention is shown in FIG. 3. This system is particularly useful for stripping and enriching partially miscible components from an aqueous medium containing other dissolved compounds such as salt, sulfuric acid or caustic which increase the boiling point of the aqueous medium above pure water. The distillation system of FIG. 3 is similar to FIG. 2, except that in FIG. 3 an aqueous medium feed material containing vaporizable components is introduced into a distillation column 310 near the top of the column. In addition, FIG. 3 shows a decanter means 317 used for decanting at least a portion of at least one liquid stream from another liquid stream.

Referring now to FIG. 3, an aqueous medium feed material containing vaporizable components is introduce into a distillation column 310 through the conduit 320 near the top of the column 310. The feed material is contacted with a current of steam which is introduced into the column 310 near the bottom of the column 310 through a conduit 321 from the discharge section 311a of a thermal compressor 311. The steam vaporizes substantially all of the vaporizable components in the feed material. Preferably, the contacting of the feed material with the steam is carried out by a countercurrent flow.

An aqueous liquid material exits the column 310 through a conduit 322 near the bottom of the column 310 to a use point. Vapors formed in the column 310 pass through a conduit 323 near the top of the column 310 to a condenser means 312, for example, to the shell-side of a shell and tube-type heat exchanger, to condense at least a portion of the vapors. Although not shown in FIG. 3, at least a portion of the condensed vapors may be refluxed back to the column 310 near the top of the column 310.

As shown in FIG. 3, a recirculated fluid is passed through the condenser 312 for example, to the tube side of the shell and tube-type heat exchanger, through a conduit 324 from a separator 313. The recirculated fluid then exits the condenser 312 through a conduit 325. Preferably, noncondensable gases, uncondensed vapors and any condensed vapors from condenser 312 are passed through a conduit 326 to a second condenser means 316 such as a shell and tube-type heat exchanger for condensing substantially all of the vapors to a liquid condensate.

The condensed vapors or liquid condensate, herein referred to as the overhead distillate, in condenser 316 is passed from the condenser 316 through a conduit 332 to the decanter 317 for decanting an overhead distillate product from an aqueous stream. Although not shown in FIG. 3, at least a portion of the condensed vapors from the condenser means 312 and at least a portion of the overhead distillate from the condenser 316 may be combined in one conduit and passed to the decanter 317. As shown in FIG. 3, at least a portion of the overhead distillate product and at least a portion of the aqueous stream are separated in the decanter 317. The aqueous stream is passed through a conduit 338 and at least a portion of the aqueous stream is refluxed back to the column 310 through a conduit 339. At least a portion of the aqueous stream is passed to a use point through a conduit 340. The overhead distillate product from the decanter 317 is passed to a use point through a conduit 337.

The recirculated fluid leaving the condenser 312 through a conduit 325 may contain vapor as steam and liquid as water. The recirculated fluid passes to a separator 313 to separate the vapor from the liquid in conduit 325. The separator 313 provides a means to flash at least a portion of the liquid as flash steam. The recirculated fluid in the separator exits the separator 313 as a liquid through a conduit 327, and, preferably, is recycled back to the tube-side of the condenser 312 through a conduit 324 with a pump means 314. The recirculated fluid may be supplemented, as required, by make-up recirculated fluid supplied from any source, through a conduit 328 to the separator 313. For example, a stream of hot water may be introduced to the separator 313 through the conduit 328. Although the water is introduced in the separator 313, the make up water may be introduced at any point of the "recirculated fluid loop" consisting of the conduit 324 the conduit 325 and the conduit 327. A valve means 315 and a conduit 331 are used for removing at least a portion of the recirculated fluid from the conduit 324. At least a portion of the recirculated fluid may be passed from the conduit 324 to a use point through the conduit 331.

Any flash steam in the separator 313 is passed to the suction inet 311b of the thermal compressor 311 through a conduit 329. Motive steam passes through a conduit 330 to the actuating gas inlet 311c of the thermal compressor 311. The discharge end 311a of the thermal compressor 311 is in a communication with the conduit 321 which, in turn, is connected to the column 310 to supply the steam to the column 310 for vaporizing the vaporizable components in the aqueous medium.

Figure 4:
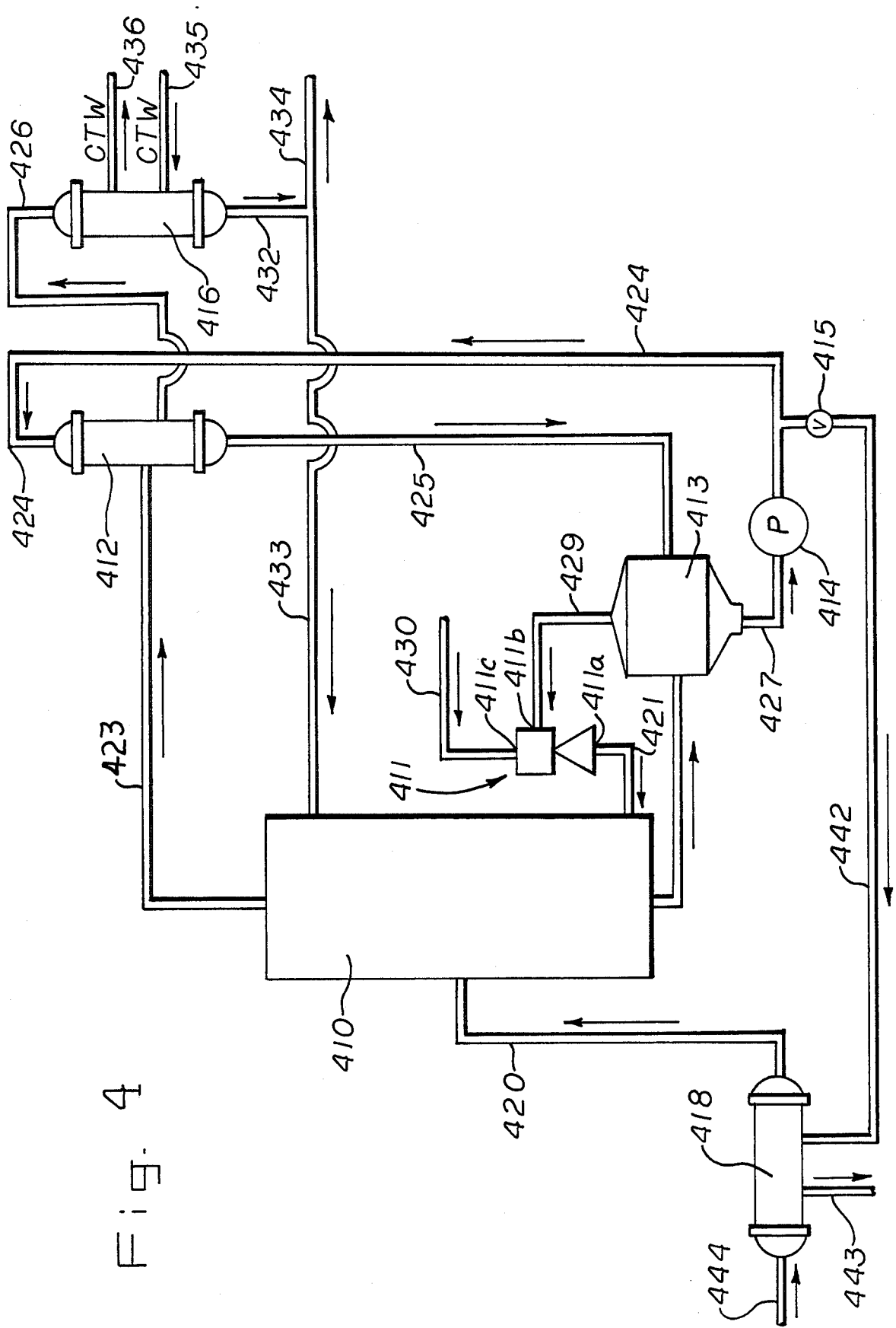
FIG. 4 is a schematic representation of yet another embodiment of a system useful in practicing the present process.

Another embodiment of the distillation system and process according to the present invention is shown in FIG. 4. Referring to FIG. 4, there is shown a system which is particularly useful for distilling miscible components from an aqueous medium such as water when the column 410 bottom temperature is within about 15° C. or less, (i.e. from 0° to about 15° C.) of the overhead vapors in conduit 423 temperature. An aqueous medium feed material containing vaporizable components is introduced, through a conduit 444 into a preheater means 418 for preheating the feed material prior to introducing the feed material into the column 410. In this instance, the preheater means 418 may be a conventional heat exchanger of the shell and tube-type. The aqueous medium feed material is passed through the conduit 444 and through the tube-side of the preheater 418. The preheated feed material exits the preheater 418 and passes through a conduit 420 into the column 410. A liquid for heating the feed material is passed through a conduit 442 and through the shell-side of the preheater 418. The liquid, preferably, is at a temperature sufficient to heat the aqueous feed material to about 0° to about 20° C. below boiling point of feed material and preferably to about 0° to about 8° C. below the boiling point of the feed material. Preferably, at least a portion or side stream of the recirculated fluid stream in the conduit 424 being pumped from the separator 413 is taken through a valve means 415 and a conduit 442 and used as the heating liquid for the preheater 418. The side stream of the recirculated fluid enters the shell-side of the preheater 418 and exits through a conduit 443 to a use point.

The preheated aqueous medium feed material containing vaporizable components is contacted with steam in the column 410. The steam is introduced to the column 410 near the bottom of the column through a conduit 421 from the discharge section 411a of a thermal compressor 411. An aqueous liquid material exits the column 410 through a conduit 422 and the liquid material passes through the conduit 422 to the separator 413 to separate vapor from liquid. At least a portion of the aqueous liquid material passed through the conduit 422 flashes to provide flash steam in the separator 413 and the flash steam is separated from the aqueous liquid in separator 413.

Vapors formed in the column 410 pass through a conduit 423 near the top of the column 410 to a condenser means 412, for example, to the shell-side of a shell and tube-type heat exchanger, to condense at least a portion of the vapors. Although not shown in FIG. 4, at least portion of the condensed vapors from the condenser mean 412 may be refluxed back to the column 410 near the top of the column 410.

As shown in FIG. 4, noncondensable gases, uncondensed vapors and condensed vapors from the condensor 412 are passed to a second condenser means 416 to condense substantially all of the vapors to a liquid condensate. The second condenser 416 may be a conventional shell and tube-type heat exchanger using cooling tower water as the cooling liquid on the shell-side of the exchanger. The condensed vapors or liquid condensate, herein referred to as the overhead distillates, pass through a conduit 432. Preferably, at least a portion of the overhead distillate is recycle back to the column 410 through a conduit 433. At least a portion of the overhead distillate may be transferred to a use point or for further processing through a conduit 434.

The recirculated liquid leaving the condenser 412 through the conduit 425 may contain vapor as steam and liquid as water. The recirculated fluid passes through the conduit 425 to the separator 413 to separate the vapor from the liquid. The separator 413 further provides a means for flashing at least a portion of the liquid in the conduit 425 to flash steam. The liquid in the separator 413 exits the separator 413 through the conduit 427 and, preferably, is recycled back to the tube-side of the condenser 412 through the conduit 424 with a pump means 414. The recirculated fluid may be supplemented, as required, with makeup recirculated fluid supplied through a conduit from any source to the separator 113. For example, a stream of hot water may be introduced to the separator 413. Although the water may be introduced in the separator 413, in another embodiment, the makeup water may be introduced at any point of the "recirculated fluid loop" consisting of the conduit 422, the conduit 424, the conduit 425 and the conduit 427.

Any steam present in the separator 413 is passed to the suction inlet 411b of thermal compressor 411 through the conduit 429. Motive steam passes through the conduit 430 to the actuating gas inlet 411c of the thermal compressor 411. The discharge end 411a of thermal compressor is connected to or in a communication with the conduit 421, which, in turn, is connected to the column 410 to supply the steam to column 410 for vaporizing the vaporizable components in the aqueous medium.

The following examples are to illustrate the present invention and the invention is not to be limited thereby.

EXAMPLE 1

This example may be carried out using a distillation system as described in FIG. 2. In this example, a concentration of 4 percent by weight (wt %) propylene chlorohydrin is stripped from an aqueous feed mixture of propylene chlorohydrin, water and hydrochloric acid and enriched to a concentration of 40 wt % propylene chlorohydrin in water. The feed mixture is fed to the center of a distillation column. As liquid feed moves down the column, it is stripped substantially free of propylene chlorohydrin by a rising flow of steam. The vapors leaving the feed point of the column are enriched in propylene chlorohydrin and contain some hydrochloric acid vapor, but the hydrochloric acid is kept down in the column by the descending flow of liquid in the upper section of the column. The vapors leaving the top of the column are rich in propylene chlorohydrin and substantially free of hydrochloric acid. The vapors pass through the shell-side of a partial condenser and leave a stream of vapor that is enriched even further in propylene chlorohydrin. The liquid in the shell-side of the partial condenser may be refluxed back to the top of the distillation column. Cooling on the partial condenser is brought about by the flash evaporation of water inside the tube-side of the condenser at a reduced pressure that is approximately 0.5 times the column pressure. The flash steam and water from the tube-side of the partial condenser are separated in a vapor-liquid separator tank, and the water from the tank is recirculated to the tube-side of the partial condenser. Hot condensate water is added to the circulating water to maintain a liquid level in the vapor liquid separator tank. The reduced pressure on the separator tank is produced by a thermal compressor which draws the flash steam out of the vapor-liquid separator and mixes the flash steam with the motive steam going to the bottom of the distillation column. The vapors leaving the partial condenser are conducted to a total condenser. Part of the liquid condensate from the total condenser is refluxed to the column, and the rest is taken out of the process as enriched propylene chlorohydrin in water. The pressure on the column is controlled by the pressure of the vacuum after the total condenser. This process produces a propylene chlorohydrin containing a reduced amount of water and hydrochloric acid and minimizes the steam consumption that is required to perform this separation.

EXAMPLE 2

This example may be carried out using a distillation system as described in FIG. 3. A concentration of 0.8 wt % phenol and 20 wt % sodium chloride in water, herein referred to as the brine feed, is fed near the top of a stripping column and distributed over a packing in the column at a rate of 8,000 pounds per hour (lb/hr). Steam is introduced into the column near the bottom of the column at a rate of 2,000 lb/hr. The steam flows up the column counter current through the flow of brine feed. The phenol is stripped from the brine feed and enriched in the overhead vapor leaving the top of the column at a rate of 1,120 lb/hr.

The rest of the steam condenses in the column to heat the brine feed to its boiling point. The overhead vapor entering a first condenser is partially condensed, approximately 600 lb/hr and the remainder of the vapor, 520 lb/hr is condensed in a second condenser. All of the condensate from the second condenser is cooled to approximately 60° C. or lower to cause the formation of two liquid layers. An aqueous layer is returned to the top of the stripping column to be mixed with the brine feed to be stripped free from phenol. The brine leaving the bottom of the column contains approximately 50 parts per million phenol. The 2,000 lb/hr of steam entering the bottom of the column contains 1,400 lb/hr of motive steam and 600 lb/hr of flash steam. The flash steam is produced by drawing a vacuum on a flash distillation chamber. The pressure of the diameter is at about one half of the pressure that is on the column. The vacuum is produced by the motive steam passing through a thermal compressor before entering the column. The vacuum flash distillation reduces the temperature of the water in the flash chamber so that the water can be used to remove heat in the partial condenser on the overhead vapor stream. The amount of water used to generate flash steam is made up with hot condensate that is available from the other processes condense steam for heat. The overall process improvement is in the requirement of only 1,400 lb/hr of boiler steam instead of the 2,000 lb/hr that is required without this improved process.

EXAMPLE 3

This example is the same as Example 2 except that residual monomers are removed from polymer latex emulsions or suspensions. In this example, styrene and butadiene removed from a styrene/butadiene latex. In this example, a latex feed of 10,000 lb/hr is striped with 3,000 lb/hr of steam wherein 2,000 lb/hr is motive steam and 1,000 lb/hr is recovered as flash steam. The hot condensate used is condensate that is generated by partial condensation of the overhead vapor.

EXAMPLE 4

This example may be carried out using the system as described in FIG. 4. In this example 1 weight percent concentration of phenol in water is stripped from water and enriched to a concentration of 9 percent phenol which is the concentration near the azeotropic concentration. A feed stream of 600 lb/hr of water containing 1 percent phenol enters the distillation column and the phenol is stripped out with 1000 lb/hr of steam wherein 700 lb/hr is motive steam and 300 lb/hr is flash steam. The flash steam is produced by drawing a vacuum on a flash distillation chamber. The pressure at the flash chamber is about one half of the pressure that is on the column. The vacuum is produced by the motive steam passing through a thermal compressor before entering the column. The vacuum flash distillation reduces the temperature of the water in the flash chamber so that the water can be used to remove heat in the partial condenser on the overhead vapor stream. The water used to generate the flash steam comes from the column bottoms stream which is allowed to pass to the flash distillation chamber to be separated into flash stream and recirculation liquid.

The overhead vapor from the column containing 9 percent phenol flows at a rate of about 888 lb/hr. The vapor is partially condensed in the shell-side of the first condenser with recirculation liquid passing through the tube-side of the condenser. The remainder of the vapors is condensed in the shell-side of a second condenser with cooling tower water passing through the tube-side of the second condenser. About 821 lb/hr of the overheads condensate from the first and second condensers is refluxed back to the column while 67 lb/hr is taken off as overheads condensate.

What is claimed is:

1. A distillation process for removing vaporizable components from an aqueous medium comprising:
   a. introducing an aqueous medium containing vaporizable components into a distillation column for removing a portion of the vaporizable components from the aqueous medium.
   b. passing through the aqueous medium a current of steam from a thermal compressor to vaporize at least a portion of the vaporizable components,
   c. passing at least a portion of the vapors from the distillation column through a first space of a first condenser means having a first and second space sufficient to condense at least a portion of the vapors to a condensate.
   d. passing a recirculation liquid to the second space of the condenser means and from the condenser to a separator to separate steam from aqueous liquid, and
   e. passing the steam from the separator through the thermal compressor to form steam for introducing into the distillation column.

2. The process of claim 1 including passing the vapors from the first condenser means through a second condenser means to condense substantially all of the vapors.

3. The process of claim 2 including recycling at least a portion of the condensed vapors from the second condenser means to the distillation column.

4. The process of claim 2 including passing the condensed vapors from the second condenser means to a decanting means to separate at least two liquids.

5. The process of claim 4 including recycling at least a portion of at least one liquid from the decanting means to the distillation column.

6. The process of claim 1 including preheating the aqueous medium in a preheater means prior to introducing the aqueous medium to the distillation column.

7. The process of claim 6 including passing at least a portion of the recirculation fluid to the preheater means for preheating the aqueous medium.

8. The process of claim 1 including passing a bottom stream from the distillation column to the separator.

9. The process of claim 1 including recycling at least a portion of the aqueous condensate from the first condenser means to the distillation column.

10. The process of claim 1 including adding an aqueous make-up stream to the recirculation fluid stream.

* * * * *